Patented June 22, 1954

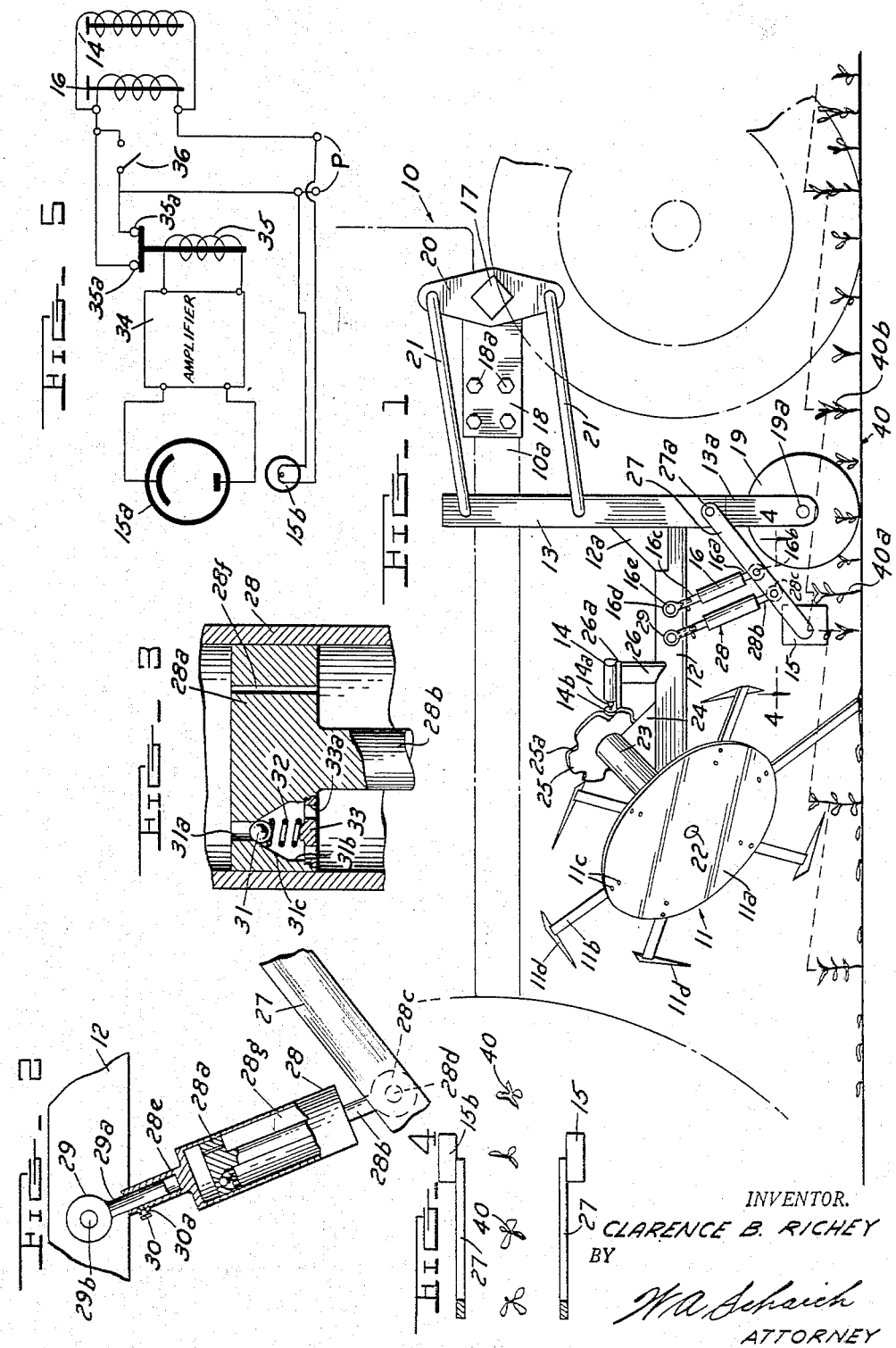

2,681,606

UNITED STATES PATENT OFFICE 2,681,606

PLANT THINNING MACHINE

Clarence B. Richey, Royal Oak, Mich., assignor, by mesne assignments, to Ford Motor Company, Dearborn, Mich., a corporation of Delaware Application October 3, 1950, Serial No. 188,201

8 Claims. (Cl. 97—11)

1

This invention relates to an improved method and apparatus for thinning the stand of plants of row crops to an optimum spacing.

In general, it is common practice to plant a greater number of seed for various row crops than is actually required. Such procedure is necessary due to the inherent inability of planting machines to precisely plant the seed and because of the uncertain germination of the seed. One such crop is cotton where the seed does not lend itself readily to precision planting and germination varies greatly with weather and soil conditions.

Obviously, if a thickly seeded row of plants is not thinned to an optimum spacing, the majority of the plants will not mature properly as a result of too much crowding. Plant thinning heretofore has been largely done by hand and such a procedure is not only laborious but exceedingly costly. While, of course, there have been plant thinning machines devised for reducing the plant stand, such prior machines thin the plant stand with mechanical precision which leaves the plants at a desired spacing but does not consider size or sturdiness of either the plant left or those removed. It is well known that the more vigorous plants will generally outstrip a weaker one and that such a vigorous plant will not only grow larger, but will produce a higher yield of the crop which it bears. It is obviously undesirable to arbitrarily remove all of these healthy, vigorous plants just because they do not happen to be located at the position in the row of the saved plants.

Accordingly, it is an object of this invention to provide an improved method and machine for reducing the plant stand in a row to an optimum number of plants.

Another object of this invention is to provide a method of plant thinning and a plant thinning machine which will thin or reduce a plant stand to a desired number of plants and which will also selectively remove only the smallest or weakest plants of the plant stand.

A further object of this invention is to provide a plant thinning machine of simple, rugged design which may be readily and cheaply manufactured.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

2

On the drawings:

Fig. 1 is a side elevational view of the plant thinning device shown mounted on a tractor.

Fig. 2 is an enlarged, detail, longitudinal, sectional view of the hydraulic cylinder control.

Fig. 3 is an enlarged, fragmentary view of Fig. 2 showing the check valve in detail.

Fig. 4 is a partial sectional view taken on the plane 4—4 of Fig. 1.

Fig. 5 is a schematic diagram showing the wiring arrangement for electrically connecting the various elements of the improved plant thinning device.

As shown on the drawings:

The improved method of plant thinning provided by this invention may be described in general terms as follows. A plant removing apparatus of any well known type is operated along a row of plants so as to remove each successive plant in the row unless a plant selecting device operates to render the plant thinning apparatus temporarily inactive for sufficient time to pass the selected plant. The plant selecting or detecting device operates entirely in response to the height of the successive plants in the row. However, the effective plant height for producing response of the plant selecting mechanism is cyclically varied in a saw tooth pattern, i. e., after each operation of the plant detecting mechanism, the response height is abruptly changed to a maximum height level above the average plant height; then the plant response height is gradually decreased from such maximum height to a minimum height over a distance of travel corresponding approximately to the desired spacing between plants after the thinning operation. Hence, if all of the plants are of uniform height, the minimum response height for the plant selecting device is adjusted to slightly less than the average height of the successive plants and the plant selecting device will function only when it reaches that point of its vertical position cycle which corresponds to the height of the particular plant to which it is adjacent. When the plants are of non-uniform height, which is generally the situation, an unusually tall plant will activate the plant selecting device even though it is located less than the desired spacing distance from the preceding plant. It is to be understood that the plant selecting device is automatically reset to its maximum height position after each actuation, thus providing a cyclically varying vertical position of the plant selecting apparatus as the plant thinning machine is traversed along the row of plants.

In Fig. 1 there is shown a plant thinning device constructed to carry out the method of this invention. Briefly, the plant thinning device is mounted on a tractor indicated generally by the numeral 10 and comprises a plant removal device such as a wheel type hoe 11 rotatably mounted on a bracket 12 secured to a frame structure 13. A plant selecting device, here shown as an electric eye or photo-electric cell unit 15 is mounted on an arm pivoted to frame 13 and vertically lifted by a solenoid 16 to provide variation of the plant response height of such unit. Such eye is gradually lowered to within close proximity of the plants by a hydraulic cylinder control 28 which drops the arm 27 at a predetermined rate. When the light beam of photo-cell unit 15 is interrupted either by a plant taller than the average or when dropped the full limit by the cylinder 28 and interrupted by an average height plant, such photo-electric unit actuates a solenoid operated detent 14 to release hoe 11 to permit such hoe to rotate in order to save a plant. Simultaneously, photo-cell unit 15 is raised by solenoid 16 to reposition such eye for repeating the cycle.

The plant thinning device constructed in accordance with this invention will now be described in greater detail. A transverse tool bar 17 is secured to the front end of tractor 10 by suitable brackets 18 secured to the tractor main frame 10a by a plurality of bolts 18a. A vertical bracket 20 is welded or otherwise secured to the end of tool bar 17 as shown in Fig. 1 and such bracket pivotally supports a pair of rearwardly projecting vertically spaced, parallel link members 21. Links 21 are pivotally connected at vertically spaced points in suitable fashion to a vertical frame 13 as shown in Fig. 1. Frame 13 of the plant thinning device comprises a vertical channel or angle iron member having a bifurcated lower end 13a and a ground engaging wheel 19 rotatably mounted to one end by a transverse mounting pin 19a. The link members 21 permit frame 13 to raise or lower vertically as the ground wheel 19 follows the ground contour.

A bracket 12 of tubular construction is horizontally secured to frame 13 as by welding. A gusset plate 12a welded respectively to frame 13 and bracket 12 reinforces the juncture of these two members. Hoe wheel 11 comprises a flat disc hub portion 11a having a plurality of radially projecting, evenly spaced bar-like arms 11b secured thereto by rivets 11c. A hoe-like blade 11d is welded to the outer end of each arm 11b as shown in Fig. 1. Blades 11d are preferably of triangular configuration and are so disposed on the ends of arms 11b that when the blade contacts the ground, such blade will be substantially parallel with the ground and will ride on or below the ground surface as shown in Fig. 1. Blades 11d are provided for thinning the plant stand as will be later described.

Disc 11a is secured by welding to a shaft 22 which is journaled in a tubular shaft housing 23. Housing 23 is angularly disposed relative to bracket 12 and is downwardly directed as shown in Fig. 1. Shaft housing 23 is secured by welding to a mounting plate 24 welded to the top of bracket 12 as shown in Fig. 1. A circular plate 25 is suitably secured to the other end of shaft 22 and circular plate 25 abuts the upper end of shaft housing 23 thereby rotatably securing hoe wheel and shaft assembly to housing 23. A plurality of radially disposed, equally spaced notches 25a are provided about the periphery of disc 25 which are engageable by a solenoid operated detent member as will now be described.

A plate-like standard 26 is vertically secured by welding to bracket 12 forwardly of disc 25 and a shelf member 26a is horizontally secured by welding to the top of standard 26. Shelf 26a projects rearwardly to a point adjacent the disc 25 and solenoid 14 is suitably secured to shelf 26a. Solenoid 14 has a rearwardly projecting armature 14a on the end of which there is secured a detent member 14b which is selectively engageable with any of the notches 25a in disc 25. Armature 14a is spring biased outwardly to normally maintain detent 14b in engagement with notch 25a. Energization of solenoid 14 retracts armature 14a to disengage detent 14b from the notch 25a to permit rotation of hoe wheel 11 as will be later described.

An electric eye or photo-electric cell unit 15 is mounted on an arm 27 comprising a pair of bar-like members which are pivotally secured to frame 13 in transversely spaced relationship as by a bolt 27a as shown in Figs. 1 and 4. Arm 27 slopes downwardly from frame 13 as shown in Fig. 1 and a photo-cell 15a is suitably fastened to one side of the lower end of arm 27. A light source 15b comprising any conventional light bulb capable of emitting a light beam is suitably secured to the opposite side of arm 27 as shown at 15b (Fig. 4). Light source 15b is so positioned on such arm that light beam therefrom will be intercepted by photo-electric cell unit 15. Arms 27 are vertically lifted by solenoid 16 connected to bracket 12 and arms 27. An eye bolt member 16a integrally provided on the lower end of solenoid 16 permits pivotal mounting of such solenoid to arm 27 by a transverse bolt 16b. The armature 16c of solenoid 16 projects upwardly and terminates in an eye portion 16d. A bolt 16e cooperable with eye 16d pivotally mounts the upper end of solenoid 16 to bracket 12. When solenoid 16 is energized, armature 16c is drawn into solenoid 16 whereby arm 27 is raised carrying with it unit 15 for a purpose to be later explained.

After arm 27 is raised by solenoid 16, arm 27 must then be lowered to drop electric eye 15 and light source 15b respectively adjacent opposite sides of a row of plants so that the light beam of such light source will be partially interrupted by the top portions of the immediately adjacent plant to actuate the solenoids 14 and 16, which temporarily renders hoe 11 inoperative and raises photo-electric unit 15 up to its pre-selected maximum height. Such upward movement restores photo-cell unit 15 to normal energization and hence de-energizes solenoids 14 and 16. To control the lowering movement of photo-cell unit 15, there is provided a single acting hydraulic cylinder 28 which is pivotally connected to and is disposed between arms 27 and bracket 12. A piston 28a cooperates with cylinder 28 and such piston has a downwardly projecting piston rod 28b. An eye 28c is formed in the lower end of piston rod 28b and such eye is pivotally secured to arm 27 by a transverse bolt or pin 28d.

An integral axial, tubular portion 28e is provided on top of cylinder 28 and an eye bolt member 29 provided with a stem portion 29a is utilized for pivotally mounting the upper end of cylinder 28 to bracket 12, transverse bolt 29b effecting such connection. Stem portion 29a of eye member 29 cooperates with the bore of tubular portion 28e and such member is locked in a desired position of longitudinal adjustment by a set screw 30 which is radially disposed in a thickened portion of the wall of tubular portion 28e as shown at 30a. This telescoping connection between the cylinder and the eye member 29 enables arm 27 to be adjusted vertically to adjust the maximum height of electric eye unit 15 above the ground dependent upon the average height of the plants as will be later described.

Hydraulic cylinder 28 as was previously mentioned, acts in only one direction and is in effect a dashpot and is utilized to lower arm 27 at a predetermined rate following each raising by solenoid 16. In order for cylinder 28 to so function, a bleed hole 28f is provided in piston 28d through which the hydraulic fluid contained in cylinder 28 can flow slowly. Thus when arm 27 is lowered, the weight of such arm moves piston 28a downwardly and forces the hydraulic fluid contained in the lower portion of cylinder 28 as shown at 28g to flow upwardly through bleed hole 28f thereby permitting arms 27, with electric eye 15 mounted thereon, to lower at a predetermined rate of speed. Varying the diameter of hole 28f will, of course, vary the rate of drop of arm 27. The rate of fall is selected as a function of the ground speed of the carrier 10 so that photo-cell unit 15 falls from the selected maximum height level to the average level of the plants while the carrier 10 moves a distance equal to the desired plant spacing.

When arm 27 is raised, it is necessary that the dampening effect of cylinder 28 be voided to permit the rapid raising of arm 27 by solenoid 16. This end is accomplished by a ball type check valve 31. A transverse hole 31a is provided in piston 28d and such hole is counterbored as shown at 31b. The bottom of counterbore 31b is of conical configuration as shown at 31c and ball valve 31 rests in the bottom of the cone shaped portion 31c of counterbore 31b and obstructs opening 31a. Ball check valve 31 is yieldingly held there by a helical spring 32 and spring 32 is retained in position by a plug 33 screwed into a threaded end portion of counterbore 31b as best shown in Fig. 3. A plurality of ports 33a are provided in plug 33 to enable the hydraulic fluid passing by ball check valve 31 to escape to the lower portion 28g of hydraulic cylinder 28.

In Fig. 4 there is illustrated a schematic wiring diagram wherein "P" indicates a suitable power source provided on the tractor 10. Photoelectric cell 15a is connected to the input of a trigger type amplifier 34. Amplifier 34 may be of any one of several well known types which is so connected to photo-electric cell 15a so as to normally produce no power output to its load, represented by the coil of a relay 35, so long as photo-electric cell 15a is fully energized by light beams from the light source 15b. Upon a decrease in the amount of light impinging upon photo-electric cell 15a, trigger amplifier 34 is actuated to supply sufficient current to the coil of relay 35 to operate such relay to close the circuit through the contacts 35a. The solenoids 14 and 16 are respectively connected in parallel and are supplied from power source "P" through a circuit which includes the relay contacts 35a in series. Hence, the solenoids 14 and 16 are only energized so long as there is any decrease in the intensity of light impinging upon photoelectric cell 15a. To facilitate the starting of the entire apparatus, a manually operated by-pass switch 36 is connected in parallel with the contacts 35a of relay 35. Hence, the manual closing of switch 36 will produce immediate operation of solenoids 14 and 16 to maintain both the plant detecting device 15 and the plant removal device 11 in their respective inoperative positions.

*Operation*

In Figs. 1 and 4 there is shown a row of plants 40, and tractor 10 is so positioned relative to such row of plants that the electric eye 15a is located on one side of the row and light source 15b on the opposite side and the lowermost position of the electric eye unit 15 vertically adjusted to slightly less than the average height of the plants to be thinned. Wheel hoe 11, which is disposed rearwardly of eye 15, is also positioned in substantial alignment with plants 40 so that the lowermost one of the individual blades 11d will be aligned with the row for removal of the plants as will be shortly described.

To initiate operation of the plant thinning machine, the arm 27 is raised to its maximum height position by the operator's momentary operation of by-pass switch 36. Immediately as the tractor 10 is started along the row, by-pass switch 36 is opened by the operator. This restores the hoe wheel to its operating condition wherein it is restrained against rotation by the solenoid controlled detent 14d and hence the lowermost blade of the hoe wheel 11 will be dragged through the ground and will effect the removal of each plant contacted. Concurrently, the arm 27 is gradually lowered by the force of gravity and the rate of fall of the arm is controlled by the dashpot 28. If no plant is encountered during such fall, which is of greater than average height, there will be no interruption of the light beam impinging upon the photo-electric cell 15a until the plant detecting unit is dropped to approximately the average height level of the plants in the row. Immediately upon a top portion of any plant effecting an interruption of the light beam on the photo-electric cell 15a, the trigger amplifier 34 will operate to energize solenoids 14 and 16 through relay 35. Solenoid 14 withdraws the detent 14b from engagement with the hoe wheel 11, permitting the hoe wheel 11 to rotate and thus save the particular plant which initiated the operation of the plant detecting device. Concurrently, the energization of solenoid 16 will abruptly restore the arm 27, and hence the plant detecting unit 15 to the pre-selected maximum height level above the average level of the plants in the row. Such raising movement of the plant detecting device restores the full intensity of the light beam from light source 15b impinging upon photo-electric cell 15a and hence deenergizes amplifier 34 and deactivates solenoids 14 and 16, restoring the entire apparatus to the starting condition of the cycle.

It will thus be observed that the vertical position of the plant detecting device 15 is cyclically varied in a generally saw tooth wave configuration, starting with an abrupt rise to the pre-selected maximum height level whenever the photo-electric cell 15a detects the top portion of an adjacent plant and then gradually lowering at a constant rate until the photo-electric cell 15a again detects the top portions of a plant in the row. Hence, a cyclical path of movement of the plant detecting device 15 is a set up as indicated by the dotted lines in Fig. 1.

It should be particularly noted that whenever an unusually large plant, such as the plant 40a, is encountered at a point which would normally be intermediate the desired plant spacing, such large plant will be saved if it is tall enough to partially interrupt the light impinging on the photo-electric cell 15a. It should be further noted that each plant saved by the described apparatus becomes the reference position for starting the desired spacing between plants so that with occasional larger plants in the row, such larger plants are saved irrespective of their positions relative to the preceding saved plant of normal size, and normal spacing between the large saved plant and the next succeeding saved plant of normal size is maintained, as best shown by the space between the saved plants 40a and 40b in Fig. 1.

From the foregoing description, it is clearly apparent that there is here provided a method and apparatus for plant thinning which will selec- all the plants are of relatively uniform size, will thin such plants to an even spacing. As this plant thinning device is of simple, rugged construction, such device will provide long service at low operating cost. It is further pointed out that this plant thinning device substantially eliminates the need for any expensive hand thinning of the plants thereby effectively reducing the cost to the farmer of raising the plants to maturity.

It will, of course, be understood that various details of construction may be varied through a wide range without departing from the principles of this invention and it is, therefore, not the purpose to limit the patent granted hereon otherwise than necessitated by the scope of the apepnded claims.

I claim:

1. The method of plant thinning which comprises traversing a plant removing device along a row of plants, traversing a plant height responsive device along the row in advance of said plant removing device, interconnecting said plant removing device and said plant height responsive device to render said plant removing device temporarily inoperative upon actuation of said plant height responsive device, raising the response height of said plant height responsive device to a pre-selected level above the average plant height after each actuation of the plant height responsive device, and gradually lowering the height of said plant height responsive device from said pre-selected level.

2. The method of plant thinning which comprises traversing a plant detecting device along a row of plants, said device being capable of producing a control action when positioned laterally adjacent any portion of a plant, cyclically controlling the vertical position of said plant detecting device by raising said device to a pre-selected level after each control action produced thereby and gradually lowering said device until a control action is produced by one of the laterally adjacent plants, traversing a plant removing device along the row of plants immediately behind said plant detecting device and normally positioned to remove successive plants from the row, and rendering said plant removing device temporarily inoperative in response to the control action of said plant detecting device to pass over said one plant producing said control action.

3. The method of selecting saved plants in plant thinning operations comprising the steps of traversing a plant sensitive device along a row of plants, said plant sensitive device being of a type capable of producing a control action when positioned laterally adjacent any portion of a plant, and cyclically varying the effective response height of said plant sensitive device in a generally saw tooth pattern, rising abruptly to a maximum response height above the average level of the plants and a decreasing gradually to a minimum height level somewhat less than the average height of the plants in the row.

4. The method of selecting saved plants in plant thinning operations comprising the steps of traversing a plant sensitive device along a row of plants, said plant sensitive device being of a type capable of producing a control action when positioned laterally adjacent any portion of a plant, raising said plant sensitive device abruptly after each control action to a maximum height level above the average level of the plants, and gradually lowering said plant sensitive device at a constant rate from said maximum level.

5. Plant selecting mechanism for a plant thinning device comprising a portable support movable along a row of plants, a plant sensitive device shiftably mounted on said support for vertical movement relative to the row of plants, said plant sensitive device including means for producing a control action when positioned adjacent any portion of a plant, means responsive to said control action for abruptly raising said plant sensitive device to a maximum height level above the average height of the plants in the row, and means for gradually lowering said plant sensitive device from said maximum height level.

6. Plant selecting mechanism for a plant thinning device comprising a portable support movable along a row of plants, a photo-electric plant detecting device shiftably mounted on said support for vertical movement relative to the row of plants, said photo-electric device being constructed and arranged to produce a reaction when positioned laterally adjacent any portion of a plant, power means responsive to said reaction of said photo-electric device and operable between said photo-electric device and said support for raising said photo-electric device to a maximum height level above the average height of the plants in the row, and means for gradually lowering said photo-electric device at a uniform rate from said maximum height level.

7. Plant selecting mechanism for a plant thinning device comprising a portable support movable along a row of plants, a plant sensitive device shiftably mounted on said support for vertical movement relative to the row of plants, said plant sensitive device including means for producing a control action when positioned adjacent any portion of a plant, means responsive to said control action for abruptly raising said plant sensitive device to a maximum height level above the average height of the plants in the row, and means for gradually lowering said plant sensitive device at a uniform rate from said maximum height level, a plant removing device mounted on said portable support and shiftable between operative and inoperative positions relative to the plants in the row, said plant removing device being normally positioned to remove all plants contacted in the row, and means responsive to said control action for temporarily shifting said plant removing device to its said inoperative position for a sufficient interval to permit said plant removing device to pass the particular plant which produced said control action.

8. Plant selecting mechanism for a plant thinning device comprising a portable support movable along a row of plants, a photo-electric plant detecting device shiftably mounted on said support for vertical movement relative to the row of plants, said photo-electric device being constructed and arranged to produce a reaction when positioned laterally adjacent any portion of a plant, power means responsive to said reaction of said photo-electric device and operable between said photo-electric device and said support for raising said photo-electric device to a maximum height level above the average height of the plants in the row, and means for gradually lowering said photo-electric device at a uniform rate from said maximum height level, a plant removing device mounted on said movable support and shiftable between operative and inoperative positions relative to the plants in the row, said plant removing device being normally positioned to remove all plants contacted in the row, and means responsive to said reaction for temporarily shifting said plant removing device to its said inoperative position for a sufficient interval to permit said plant removing device to pass the particular plant which produced said reaction.

References Cited in the file of this patent

UNITED STATES PATENTS

| Number | Name | Date |
| --- | --- | --- |
| 1,190,849 | Berriman | July 11, 1916 |
| 1,303,798 | Janes | May 13, 1919 |
| 2,177,803 | Ferte et al. | Oct. 31, 1939 |
| 2,327,204 | McLemore | Aug. 17, 1943 |
| 2,507,001 | Ferte | May 9, 1950 |
| 2,535,720 | Boncompain | Dec. 26, 1950 |

FOREIGN PATENTS

| Number | Country | Date |
| --- | --- | --- |
| 965,868 | France | Feb. 22, 1950 |